(12) United States Patent
Beattie, Jr. et al.

(10) Patent No.: US 8,843,165 B2
(45) Date of Patent: Sep. 23, 2014

(54) ENHANCED DELIVERY OF MESSAGING DATA TRAFFIC

(75) Inventors: James Gordon Beattie, Jr., Bergenfield, NJ (US); Soumyajit Chakraborty, Harrison, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 341 days.

(21) Appl. No.: 12/963,606

(22) Filed: Dec. 8, 2010

(65) Prior Publication Data
US 2012/0149404 A1   Jun. 14, 2012

(51) Int. Cl.
*H04W 4/00* (2009.01)
*H04M 1/66* (2006.01)
*H04M 3/42* (2006.01)
*H04M 11/10* (2006.01)

(52) U.S. Cl.
USPC ........ 455/466; 455/507; 455/411; 455/414.1; 455/413; 455/432.2

(58) Field of Classification Search
USPC ............ 455/466, 507, 411, 414.1, 413, 432.2
See application file for complete search history.

(56) References Cited

U.S. PATENT DOCUMENTS

| 7,171,222 | B2 | 1/2007 | Fostick | |
|---|---|---|---|---|
| 7,610,043 | B2 | 10/2009 | Bae | |
| 7,765,263 | B1 | 7/2010 | Alfke | |
| 2003/0172173 | A1* | 9/2003 | Fenton | 709/231 |
| 2004/0203956 | A1* | 10/2004 | Tsampalis | 455/466 |
| 2007/0226365 | A1* | 9/2007 | Hildreth et al. | 709/231 |
| 2010/0075699 | A1* | 3/2010 | Kupsh et al. | 455/466 |

* cited by examiner

*Primary Examiner* — Christopher M Brandt
*Assistant Examiner* — Muthuswamy Manoharan
(74) *Attorney, Agent, or Firm* — Hartman & Citrin LLC (57) ABSTRACT

Devices, systems, and methods are disclosed for delivering enhanced message content to subscribers and for overcoming common incompatibilities found in message delivery mechanisms. Exemplary embodiments, profile an intended recipient's network capabilities, the intended recipient's device, and/or the recipient's service feature profile. This profile is leveraged to predictively and adaptively adjust the subsequent enhanced message content delivery process. Further, content modification can be applied for those cases where there is a defined mismatch that can be handled in order to facilitate delivery of the substance of the enhanced content. Finally, in cases where the content needs to be delivered intact to the intended recipient, but where the recipient network, the recipient's device and/or the recipient's service profile do not allow for delivery, the content may be delivered to an alternative device or system. These alternative devices or systems may be managed by the sender, the recipient, or a service provider's network.

20 Claims, 9 Drawing Sheets

FIG. 9

ENHANCED DELIVERY OF MESSAGING DATA TRAFFIC

BACKGROUND OF THE SUBJECT DISCLOSURE

1. Field of the Subject Disclosure

The present subject disclosure relates to mobile devices. In particular, the present subject disclosure relates to the delivery of messages to mobile devices.

2. Background of the Subject Disclosure

Mobile devices, such as cellular telephones, are more and more ubiquitous in today's world. More powerful mobile devices with advanced features, such as smartphones having cameras, enable various types of communication services beyond the traditional voice calls. Mobile devices are now an important tool for both business and personal use.

Mobile devices are frequently used for sending and receiving messages. Such devices may, for instance, send basic text messages using Short Message Service (SMS) and enhanced messages using Multimedia Messaging Service (MMS). Currently, when enhanced content is submitted to the network for delivery to a recipient, the network attempts to deliver the content to the recipient's device. If there is an incompatibility either in the network, or with the intended recipient's device or service profile, then the intended recipient is left unaware of the attempt to deliver content, and the sender is provided with a message indicating that the recipient's device or service profile prevented successful delivery. Currently, the sender of the rejected message needs to review the rejection message and then decide to either retry to send the message, to ignore the failure, to send the intended recipient a simple SMS message indicating the failure or to call the recipient and ask how they might deliver the content another way. Often this results in a lack of communication, the sending of the information to an email account, or the posting of the information on a social networking site. None of these possibilities are ideal for the sender or the recipient.

What is therefore needed are devices, systems, and methods to deliver a message in a format a receiving device is capable of receiving while retaining as much of the substance of the content from the original message as possible.

SUMMARY OF THE SUBJECT DISCLOSURE

The present subject disclosure solves the above problems by delivering enhanced message content to subscribers and overcoming common incompatibilities found in message delivery mechanisms. Exemplary embodiments of the present subject disclosure profile an intended recipient's network capabilities, the intended recipient's device, and/or the recipient's service feature profile. This profile is leveraged to predictively and adaptively adjust the subsequent enhanced message content delivery process. Further, content modification can be applied for those cases where there is a defined mismatch that can be handled in order to facilitate delivery of the substance of the enhanced content. Finally, in cases where the content needs to be delivered intact to the intended recipient, but where the recipient network, the recipient's device and/or the recipient's service profile do not allow for delivery, the content may be delivered to an alternative device or system. An informational reference vector, such as a Universal Resource Locator (URL), is delivered to the intended recipient's device to locate the content. These alternative devices or systems may be managed by the sender, the recipient, or a service provider's network.

In one exemplary embodiment, the present subject disclosure is a mobile device for messaging over a cellular network. The mobile device includes a processor; a cellular transceiver in communication with the processor to enable communication with the cellular network; a memory in communication with the processor; and a compatibility logic on the memory, the compatibility logic to determine that a first format of a message created on the mobile device is incompatible with a recipient device, convert the message into a second format compatible with the recipient device, and send the converted message to the recipient device.

In another exemplary embodiment, the present subject disclosure is a system for mobile messaging. The system includes a cellular network; a sending mobile device in communication with the cellular network, the sending mobile device creating a message in a first format; a compatibility server on the cellular network; and a recipient mobile device in communication with the cellular network, a compatibility logic on the compatibility server, the compatibility logic to determine that a first format of a message created on the sending mobile device is incompatible with a recipient mobile device, convert the message into a second format compatible with the recipient mobile device, and send the converted message to the recipient mobile device.

In yet another exemplary embodiment, the present subject disclosure is a method of sending converted messages. The method includes receiving a message in a first format from a sending mobile device at a compatibility server; referencing a compatibility database for capabilities of a recipient mobile device; adapting the message into a converted message in a second format compatible with the recipient mobile device; and sending the converted message to the recipient mobile device.

DETAILED DESCRIPTION OF THE SUBJECT DISCLOSURE

The present subject disclosure presents devices, systems, and methods for delivering enhanced message content to subscribers and for overcoming common incompatibilities found in message delivery mechanisms. Exemplary embodiments of the present subject disclosure profile an intended recipient's network capabilities, the intended recipient's device, and/or the recipient's service feature profile. This profile is leveraged to predictively and adaptively adjust the subsequent enhanced message content delivery process. Further, content modification can be applied for those cases where there is a defined mismatch that can be handled in order to facilitate delivery of the substance of the enhanced content. Finally, in cases where the content needs to be delivered intact to the intended recipient, but where the recipient network, the recipient's device and/or the recipient's service profile do not allow for delivery, the content may be delivered to an alternative device or system. An informational reference vector, such as a Universal Resource Locator (URL), is delivered to the intended recipient's device to locate the content. These alternative devices or systems may be managed by the sender, the recipient, or a service provider's network.

Exemplary embodiments of the present subject disclosure automate the maintenance of the delivery improvement process for enhanced message content by using any means possible at various stages of the message origination or delivery process using a variety of mechanisms. For instance, exemplary embodiments of the subject disclosure add a network indicator to the recipient's entry in the sender's address book and match that to the capabilities of their network. Exemplary embodiments add a set of capabilities tags to the recipient's entry in the sender's address book and use that to adjust the enhanced message content or to re-vector the delivery of enhanced message content and related notifications.

According to exemplary embodiments, rejection messages are automatically processed in the sender's device and/or a compatibility server to adaptively identify those recipient's devices, service, and networks that cannot handle the enhanced message traffic. This data may be pushed to automatically update the address book and network directory information so as to reduce future content rejections and improve message delivery in the future. Exemplary embodiments of the present subject disclosure automatically select, from the sender's address book or network directory, information that will tailor the delivery mechanism that is most reliable for the intended recipient. When appropriate, the content of an enhanced message is reformatted for delivery to the intended recipient in a more basic delivery mode, such as SMS. Further, when appropriate, an SMS message is sent to the intended recipient indicating the availability of the enhanced message content and its sender.

In exemplary embodiments of the subject disclosure, when a rejection message is received by the sender's device and/or the compatibility server, it automatically generates a formatted message to the intended recipient requesting a reply which indicates capabilities of the recipient, the preferred location (URL, email address, web portal) for delivery of enhanced message content, etc. Upon receipt of the formatted reply to the above request, the sender's address book or the compatibility server entry for that recipient is updated. As both the sender's and recipient's network capabilities evolve, the capability profiles are updated in both the address book and the compatibility server to reflect the current capabilities.

Exemplary embodiments of the subject disclosure provide a function for the sender or their device to automatically initiate a profile update for enhanced message content handling for one or more users in the sender's address book or in the network message server. Further, exemplary embodiments of the subject disclosure provide a status and delivery vectoring if the recipient is offline or unreachable.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable mobile devices to access the contents of a database. Billing servers, application servers, etc. are examples of such servers. A server can include several network elements, including other servers, and can be logically situated anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

For the following description, it can be assumed that most correspondingly labeled structures across the figures (e.g., 100 and 200, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
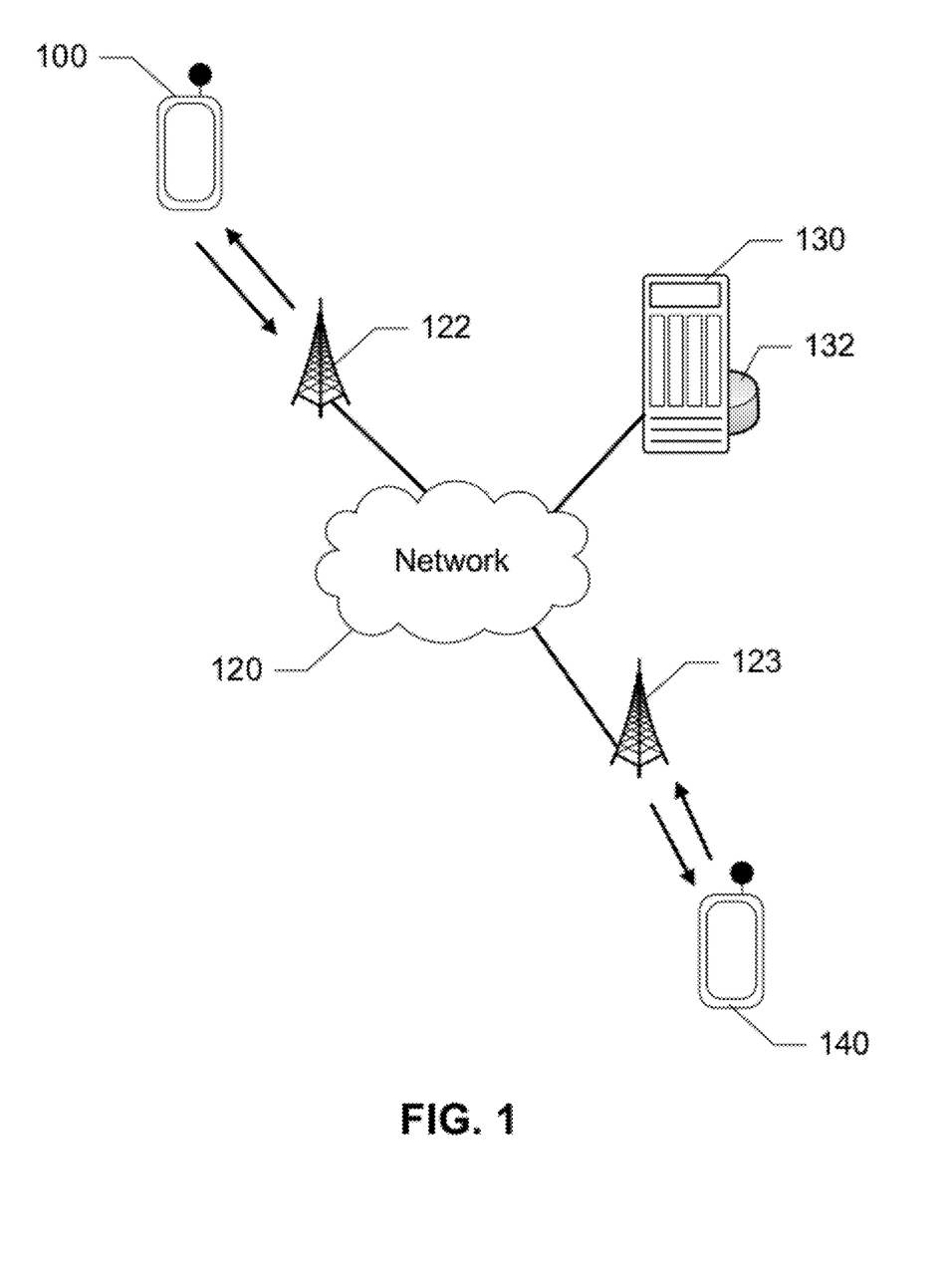
FIG. 1 shows a system for enhanced delivery of messaging data traffic, according to an exemplary embodiment of the present subject disclosure.

FIG. 1 shows a system for enhanced delivery of messaging data traffic, according to an exemplary embodiment of the present subject disclosure. In this embodiment, the system includes a sending mobile device 100, a recipient mobile device 140, a cellular network 120, a compatibility server 130 on cellular network 120, and a compatibility database 132 in communication with compatibility server 130.

Sending mobile device 100 is in communication with cellular network 120 to send and receive messages, make voice calls, access data services, etc. When a user of sending mobile device 100 desires to send a message to recipient mobile device 140, the user selects the message type and the recipients for the message. This message may be a text message such as an SMS message, a picture message or video message such as a MMS message, a voice message such as voicemail, an e-mail, etc. The user creates the message by typing a message, selecting a file for a picture or video message, recording a voice or video message, etc. A picture or video file may be onboard sending mobile device 100, onboard a server on network 120, etc. The user then selects to send the message and sending mobile device 100 transmits the message to cellular network 120 via a base transceiver station 122.

Cellular network 120 provides a radio network for communication between devices, including sending mobile device 100 and recipient mobile device 140. Wireless carriers typically provide service to a geographic market area by dividing the area into many smaller areas or cells. Each cell is serviced by a radio transceiver, such as base transceiver stations 122 and 123. Base transceiver stations 122 and 123 connect to other elements of cellular network 120 that are known in the art and therefore not shown. For instance, base transceiver stations 122 and 123 connect to Mobile Switching Centers (MSCs) through landlines or other communication links, and the MSCs may, in turn, be connected via landlines to the Public Switched Telephone Network (PSTN), to other cellular networks, to IP networks, etc. Many other components are present in cellular network 120, but are not presented for sake of simplicity. These components will be apparent to one of ordinary skill in the art in light of this disclosure.

Compatibility server 130 is a server located on cellular network 120. According to embodiments of the subject disclosure, compatibility server 130, along with compatibility database 132, profiles the capabilities of recipient mobile device 140 and adjusts the content sent to recipient mobile device 140 based upon these capabilities. For instance, compatibility server 130 may strip down content based upon the capabilities of recipient mobile device 140. If recipient mobile device 140 is not capable of receiving MMS messages, but is capable of receiving SMS messages, compatibility server 130 may convert a MMS message from sending mobile device 100 into an SMS message with a URL and send this converted message to recipient mobile device 140. Alternatively, the text of the MMS message is sent to recipient mobile device 140 with an attached URL to view a picture or video. Compatibility server 130 also processes any rejection messages from a failed delivery and sends the content to recipient mobile device 140 in a compatible form. Thus, rather than not receiving any message, or even an indication of a message, recipient mobile device 140 receives the content in a format available to recipient mobile device 140. Such conversion of the message may be completely transparent to the user of sending mobile device 100.

Compatibility database 132 includes a profile of the capabilities of cellular network 120 as well as other networks in communication with cellular network 120. For instance, compatibility database 132 knows the capabilities of cellular network 120 and may further know the capabilities of other networks in communication with cellular network 120 including message and data formats supported by these networks. Compatibility database 132 further includes capabilities of mobile devices that may connect to cellular network 120 and/or other networks. For instance, some mobile devices may not be capable of receiving certain types of content. Many mobile devices are limited to receiving text messages or picture messages. Compatibility database 132 contains these capabilities of the mobile device. Compatibility database 132 may further include the service profile for subscribers to cellular network 120 and/or other networks. Thus, compatibility database 132 contains information as to the services to which recipient mobile device 140 is subscribed. With all of this information, compatibility server 130 is capable of determining exactly which formats are possible for each recipient mobile device. By sending content using an available capability of recipient mobile device 140, compatibility server 130 saves network resources that would otherwise be wasted by messages that cannot be received. To determine many of these capabilities, compatibility server 130 updates compatibility database 132 with known capabilities of each network/device/service profile. Many networks have well known availability and limitations of services. Capabilities may be further determined by querying networks or mobile devices, knowledge pushed to compatibility server 130 from a network or mobile device, etc.

According to embodiments of the subject disclosure, querying of a recipient mobile device 140 or a network may occur when content sent to recipient mobile device 140 is determined to be undeliverable. At this time, compatibility server 130 may send a query to recipient mobile device 140 or the network of recipient mobile device 140, asking recipient mobile device 140 or the network of recipient mobile device 140 for its capabilities. Further, when a network upgrades capabilities, the new capabilities may be pushed to or otherwise transmitted to compatibility server 130. For instance, when a service provider is informed of upgrades or downgrades to its network or that of another service provider, the service provider updates compatibility database 132. With this information, any further attempts to send content to recipient mobile device 140 contain content in an appropriate format. Compatibility server 130 contains logic to reference compatibility database 132 to determine these appropriate formats and convert the content of the message to the appropriate format. Compatibility server 130 may periodically revalidate the capabilities of the device and/or network to assure the capabilities are current.

Compatibility server 130 may further leverage the knowledge accumulated to instruct sending mobile device 100 to behave differently going forward. For instance, compatibility server 130 may send capabilities of sending mobile device 100's contacts to sending mobile device 100. This informs sending mobile device 100 of types of messages that can be received by each contact. With this information, sending mobile device 100 may convert messages to an appropriate format, only allow messages to be sent in an appropriate format, notify the user of capabilities of contacts, notify the user if the message format will be changed by compatibility server 130, etc. Further, sending mobile device 100 may only send messages to compatibility server 130 if compatibility server 130 needs to convert the message format. Thus, messages that can be delivered in the original message format are sent directly to recipient mobile device 140 via cellular network 120.

If messages cannot be sent due to recipient mobile device 140 being offline or unreachable, compatibility server 130 may notify sending mobile device 100 of this status. Compatibility server 130 may further store the message until it is deliverable. Compatibility server 130 may provide sending mobile device 100 with further options for delivering the message to recipient mobile device 140 or to an alternative address.

Compatibility database 132 stores a user profile for recipient mobile device 140 as well as other mobile devices on cellular network 120, mobile devices which have communicated with mobile devices on cellular network 120, other known mobile devices, etc. The user profile contains capabilities, preferences, settings, etc., for recipient mobile device 140. These stored capabilities, preferences, and settings may be based upon previous communications to recipient mobile device 140, inputs by a user of sending mobile device 100 or recipient mobile device 140, previous communications with the network of recipient mobile device 140, knowledge of the type of device or network, common incompatibilities, etc.

Recipient mobile device 140 is a device capable of communicating with cellular network 120. Recipient mobile device 140 has a plurality of capabilities for receiving content. Recipient mobile device 140 may be capable of sending and/or receiving one or more of voice calls, text messages, picture messages, video messages, voicemail, e-mail, etc. Recipient mobile device 140 may further be capable of connecting to the Internet using a cellular data connection, a WiFi connection, a wired connection, a near-field communication connection such as BLUETOOTH, etc.

In other embodiments of the present subject disclosure, contacts on sending mobile device 100 each include an indicator of the capabilities of the respective recipient mobile device. This feature informs the user of the contacts that can receive the exact type of message being sent and which contacts may require a conversion to a different message type. Sending mobile device 100 may further allow the user to choose alternative means of message delivery. For instance, if recipient mobile device 140 cannot receive an MMS message, the user may select that recipient mobile device 140 is instead sent an SMS message with an accompanying URL to locate the media file. If recipient mobile device 140 cannot receive SMS messages, the user may select to send recipient mobile device 140 a voice message including an audible version of the message. This audible message may be created by converting text to speech at sending mobile device 100, at compatibility server 130, etc. In the case of sending device 100 attempting to send a MMS message to recipient mobile device 140 and recipient mobile device 140 not capable of either SMS or MMS, compatibility server 130 may store the message on network 120 and recipient mobile device 140 is given a URL of the location of the message through a voice message.

In embodiments of the subject disclosure, the compatibility server may further decode a voicemail to the recipient mobile device into a text message or e-mail. For instance, the voicemail storage of the recipient mobile device may be full. The compatibility server allows the sending mobile device to record a voicemail. This voicemail may be stored on the compatibility server, may be converted to a text message or e-mail and delivered to the recipient mobile device, etc. A text message or e-mail may also be converted to a voicemail at the compatibility server and delivered to the voicemail box of the recipient mobile device. Such a feature may be useful if the text messaging folder of the recipient mobile device is full.

Such a system may be useful in many situations. For instance, the user of the sending mobile device may be sending a video message to a large group of contacts. Many of these contacts may be able to receive the video message on their mobile devices, but others may not have the capability. By converting the message, when necessary, to different formats, each of the contacts can receive the message in a format suited to his or her phone. Some contacts may receive the message as a picture message or text message, but all contacts receive as much of the substance of the message content as possible.

Additionally, while two mobile devices are shown, any number of mobile devices may be recipients of a message. The compatibility server may receive a message from the sending mobile device for distribution to multiple recipient mobile devices. The compatibility server may convert the message to the appropriate format for each of the recipient mobile devices. Thus, different message formats may be transmitted to each of the recipient mobile devices, depending upon the capabilities of the recipient mobile device or network the recipient mobile device is connected through.

While two base transceiver stations are shown in this embodiment, it should be understood that a single base transceiver station would suffice when the first mobile device and second mobile device are both within the cell served by the single base transceiver station. Communications are sent from the first mobile device to the compatibility server on the cellular network through the single base transceiver station and from the compatibility server to the second mobile device through the single base transceiver station.

Figures 2A, 2B:
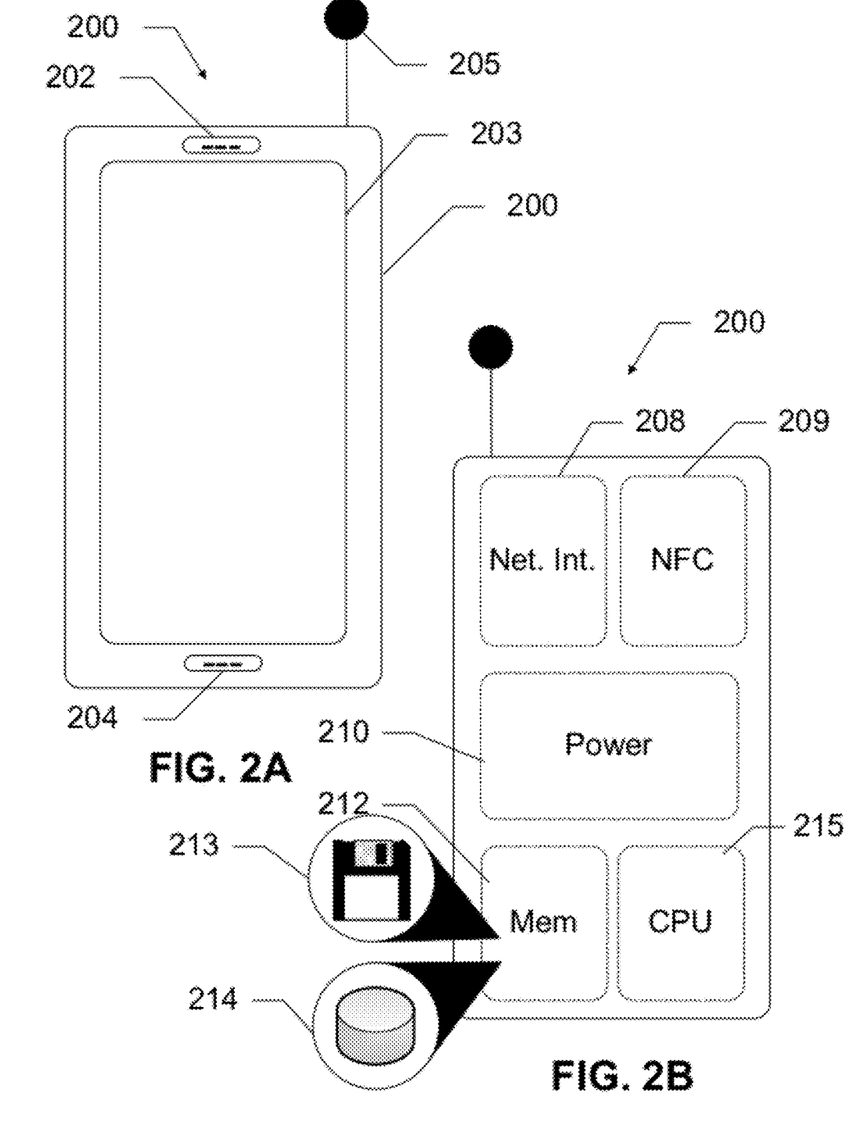
FIGS. 2A and 2B respectively show the external and internal components of a mobile device, according to an exemplary embodiment of the present subject disclosure.

FIGS. 2A and 2B respectively show the external and internal components of a mobile device 200, according to an exemplary embodiment of the present subject disclosure. Mobile device 200 includes a speaker 202, a display 203, a microphone 204, and an antenna 205. Mobile device 200 further includes a network interface 208, a near-field communication (NFC) transceiver 209, a power supply 210, a central processing unit (CPU) 215, and a memory 212. Speaker 202 provides an audio output for mobile device 200. Display 203 is an LCD, LED or other type of display on which a user can view selections, numbers, letters, etc. Display 203 allows the user to view messages being created or received, including, for instance, video messages sent to mobile device 200. Display 203 can also be a touchscreen, thereby being used as an input device. In embodiments not using a touchscreen, a keypad is typically used as an input device, for instance, to type a telephone number or a message. Such a keypad may be a numerical keypad, a QWERTY keyboard, etc. Microphone 204 allows the user to verbally communicate with others using mobile device 200. Microphone 204 may be used to capture audio of a voice message. Antenna 205 is a transducer designed to transmit or receive electromagnetic waves to and from a network. In conjunction with antenna 205, network interface 208 allows mobile device 200 to wirelessly communicate with a cellular network or with other mobile devices across the cellular network. Network interface 208 may be a cellular transceiver, wireless transceiver, etc., and includes combinations of transceivers to communicate with assorted wireless networks. NFC transceiver 209 enables mobile device 200 to wirelessly communicate over short ranges with other NFC devices. NFC transceiver 209 can be, for instance, a BLUETOOTH® transceiver or a contactless integrated circuit card (CICC). In embodiments of the subject disclosure, NFC transceiver 209 may be used to deliver messages to or receive messages from a device or network. Power supply 210 provides power to each of the components of mobile device 200, and can include a battery, as well as an interface to an external power supply. CPU 215 controls components of mobile device 200 according to instructions in logic stored on memory 212. Memory 212 comprises any computer readable medium, such as RAM, ROM, etc. Memory 212 stores compatibility logic 213, in addition to logic for operating the components of mobile device 200. Compatibility logic 213 contains instructions for delivering messages to a recipient mobile device over a network. In embodiments of the subject disclosure, compatibility logic 213 may further contain instructions for converting messages into a different format which the recipient mobile device is capable of receiving. Memory 212 further contains a compatibility database 214. Compatibility database 214 may contain contact information, user preferences, previous messages, etc. Contact information may include an indication of types of messages which a contact can receive. User preferences may include alternative message formats desired by the user in different instances. For example, the user may choose to have video messages converted to picture messages with an included URL when the recipient mobile device is unable to receive video messages.

Figure 3:
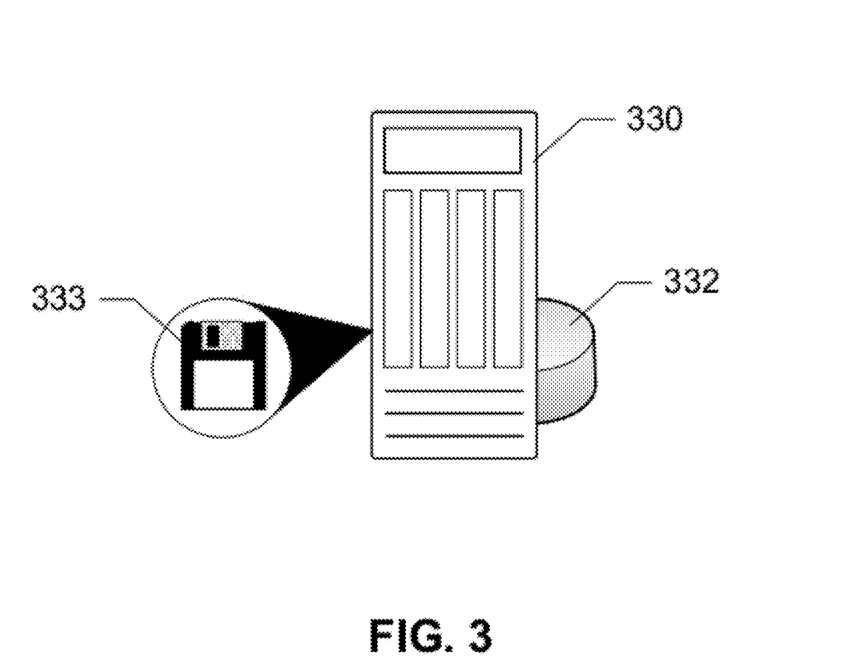
FIG. 3 shows a compatibility server for enhanced delivery of messaging data traffic, according to an exemplary embodiment of the present subject disclosure.

FIG. 3 shows a compatibility server 330 for enhanced delivery of messaging data traffic, according to an exemplary embodiment of the present subject disclosure. Compatibility server 330 is an application server located on a cellular network. Compatibility server 330 includes compatibility logic 333 and includes or is in communication with a compatibility database 332. Compatibility server 330 is in communication with messaging servers, such as a Short Message Service Center (SMSC), a Multimedia Messaging Service Center (MMSC), etc., and receives or screens outgoing messages from a sending mobile device. When a message is addressed to a recipient mobile device which cannot receive the messaging format of the message, compatibility server 330 uses compatibility logic 333 to convert the message to a format the recipient mobile device is capable of receiving. Compatibility server 330 may reference compatibility database 332 to determine these capabilities. Compatibility server 330 then sends the message to the recipient mobile device via a messaging server. Compatibility logic 333 may further include, on any converted message, an indication that the format of the message has been changed. Compatibility logic 333 may provide a URL to locate the full content of the original message, for instance, on a web portal, social networking site, personal website, etc. In embodiments of the present subject disclosure, the URL is posted on a recipient's web portal, social networking site, personal website, etc., linking to a separate page. Compatibility logic 333 may also create a new format message or signal to the sending mobile device informing the sending mobile device of the change to the format of the message. This may include an option to resend the original message in a further format.

Compatibility server 330 contains or is in communication with a compatibility database 332. Compatibility database 332 stores contact profiles. Contact profiles may contain the capabilities of the devices of the contacts, the capabilities of the service provider network or the contact, the subscribed services of the contact, alternate addresses of the contact, etc. The capabilities of the device may include messaging capabilities as well as other device capabilities, such as WiFi, GPS, etc. The contact profiles may further include preferences for converting a message. These preferences are referenced when the contact is sending a message or when the contact is receiving a message. These user profiles may be programmed by the participants through their respective mobile device, programmed using a personal computer, learned by compatibility server 330 based upon previous sessions, pushed to compatibility server 330, etc. Compatibility database 332 may also store a copy of previous messages for later use, for retrieval of the message, etc. Thus, the sending mobile device, the recipient mobile device, or another authorized user can access the message at a later time by accessing compatibility database 332.

In embodiments of the subject disclosure, the compatibility server only receives messages when the recipient mobile device is unable to receive the message from the messaging server on the network. For instance, when the sending mobile device attempts to send an MMS message to a recipient mobile device only capable of receiving SMS messages, the delivery fails and the message is sent to the compatibility server. The compatibility server references the compatibility database to determine the capabilities of the recipient mobile device. If the compatibility database does not contain the capabilities of the recipient mobile device, or the capabilities need to be updated, the compatibility server sends a message or signal to the recipient mobile device asking the recipient mobile device for its capabilities. These capabilities are returned to the compatibility server and stored in the compatibility database under the contact information for the recipient mobile device. The compatibility server uses these capabilities to convert the message from the sending mobile device into a message format the recipient mobile device is capable of receiving and sends the converted message through the messaging server.

In embodiments of the subject disclosure, the compatibility server may further decode a voicemail to the recipient mobile device into a text message or e-mail. Such a conversion may be made using speech recognition software on the compatibility server. For instance, the voicemail storage of the recipient mobile device may be full. The compatibility server allows the sending mobile device to record a voicemail. This voicemail may be stored on the compatibility server, may be converted to a text message or e-mail and delivered to the recipient mobile device, etc. A text message e-mail may also be converted to a voicemail at the compatibility server and delivered to the voicemail box of the recipient mobile device. Such a conversion may be made using text to speech software on the compatibility server. Such a feature may be useful if the text messaging folder of the recipient mobile device is full.

Figure 4:
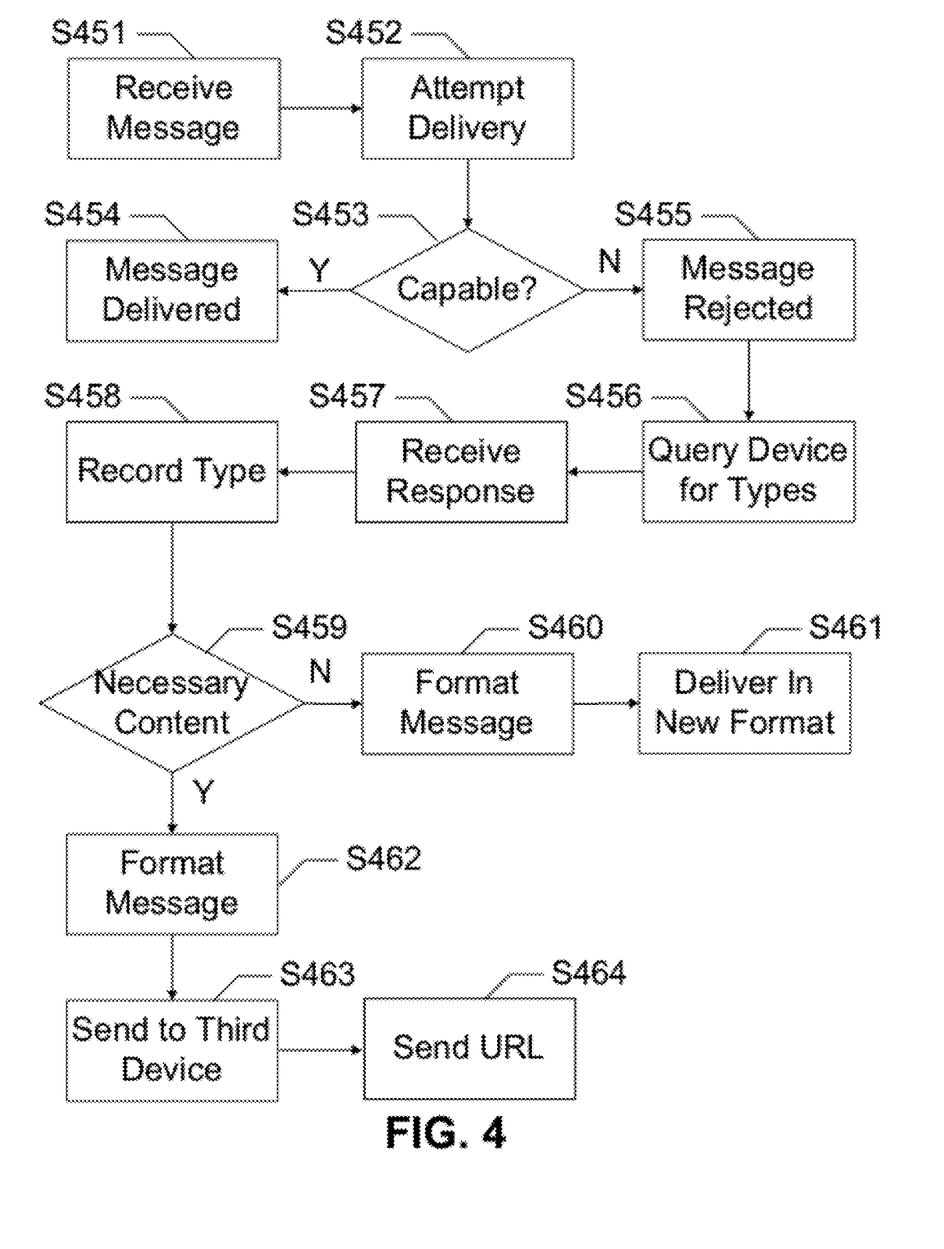
FIG. 4 shows a method of enhanced delivery of a message, according to an exemplary embodiment of the present subject disclosure.

FIG. 4 shows a method of enhanced delivery of a message, according to an exemplary embodiment of the present subject disclosure. In this embodiment, a cellular network receives a message from a sending mobile device S451. This message may be a text message, a picture message, a video message, a voice message, an e-mail, etc. The cellular network, via for instance an SMSC or MMSC, attempts to deliver the message to a recipient mobile device S452. It is then determined whether the recipient mobile device is capable of receiving the message in this message format S453. For instance, recipient mobile device may only be capable of receiving text messages, or may be capable of text messages and picture messages, but not video messages. These capabilities may be limited by the recipient mobile device, by the network of the recipient mobile device, by the subscription of the recipient mobile device, etc. If the recipient mobile device is capable of receiving the message, then the message is delivered S454. If the recipient mobile device is not capable of receiving the message, then the message is rejected by the recipient mobile device and this rejection is received by a compatibility server, S455. Once a rejection of the message is determined, the compatibility server queries the recipient mobile device for the message formats that the recipient mobile device supports S456. This may include the mobile device type, the network on which the recipient mobile device is located, the subscriptions of the recipient mobile device, a preferred location or URL to send an enhanced message, etc. The compatibility server receives a response from the recipient mobile device containing this information S457. The compatibility server then records the information into the compatibility database S458. With knowledge of the capabilities of the recipient mobile device, the compatibility server determines whether the exact content of the message is necessary S459 or whether another message type would be sufficient. For instance, the sending mobile device may send an SMS message to a recipient mobile device that cannot receive SMS messages, but can receive voice messages. If a voice message is sufficient, then a voice message, for instance a text-to-speech conversion of the SMS message, is sent to the recipient mobile device. Such a conversion may be performed by the compatibility server or another server on the cellular network. If the sending mobile device sends a video message but the recipient mobile device is only capable of receiving text messages and picture messages, a picture message containing a screen capture of the video may be sufficient. The type of message that is deemed sufficient may be determined by the user of the sending mobile device, by the compatibility server, by the cellular network, by default, etc. and may be saved in the messaging settings. For instance, the user may use an application on the sending mobile device to make selections for each message type, user, etc. If the exact content of the message is not necessary, then the message is formatted into a different message type, according to the messaging settings S460. The formatted message retains as much of the substance of the content of the original message as possible. The formatted message is then delivered to the recipient mobile device S461. If the exact content of the message is necessary, then the message is formatted such that the content remains the same, but the message may be stored on a computer readable medium for later retrieval S462. The formatted message is then sent to a third device, for instance a server on the cellular network, with a URL for retrieval S463. The URL is then delivered to the recipient mobile device in a message format supported by the recipient mobile device S464.

When a subsequent message is sent to the recipient mobile device, the compatibility server, via the attached compatibility database, references the capabilities of the recipient mobile device. After the message is received by the cellular network, the message may be sent to the compatibility server where this referencing may take the place of the steps from S452 to S458. Thus, after the capabilities are determined, the compatibility server may determine whether the exact content of the message is necessary S459 and continue.

Figure 5:
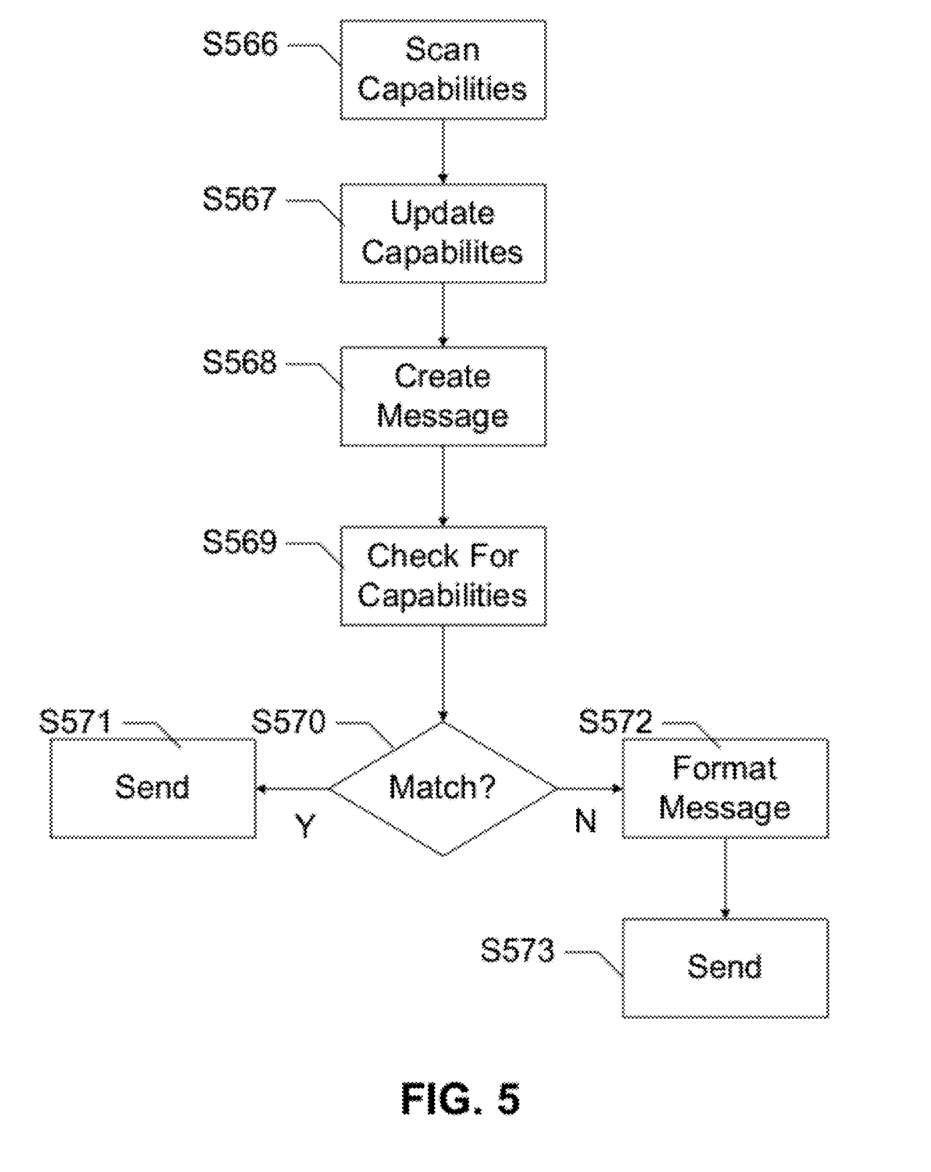
FIG. 5 shows a method of enhanced delivery of a message from a sending mobile device, according to an exemplary embodiment of the present subject disclosure.

FIG. 5 shows a method of enhanced delivery of a message from a sending mobile device, according to an exemplary embodiment of the present subject disclosure. In this embodiment, the sending device contains, or is capable of containing, an indication of the capabilities of potential recipient mobile devices. For instance, within the contacts list on the sending mobile device may be an indication of the capabilities of each contact, when known. The method begins by updating the capabilities of contacts to revalidate assumptions, by requesting a scan of the capabilities of a recipient mobile device or recipient mobile devices S566. This may be a request to all contacts, a request to selected contacts, a request to contacts not recently updated, etc. A compatibility server on the cellular network determines these capabilities and sends the capabilities back to the sending mobile device. The sending mobile device then updates these capabilities S567. With the capabilities of the recipient mobile device(s) updated, the user of the sending mobile device creates a message in a certain message format S568, for instance, a MMS picture message, and selects contacts to which to send the message. Logic on the sending mobile device checks for the capabilities of each of the selected recipient mobile device(s) S569. The logic then determines whether the message format matches the capabilities of each recipient mobile device S570. If the message format matches the capabilities of the respective recipient mobile device, the message is sent to the recipient mobile device S571 over the cellular network. If the message format does not match the capabilities of the recipient mobile device, the message is formatted to a message format the recipient mobile device is capable of receiving S572 while retaining the substance of the content of the message. The formatted message is then sent to the recipient mobile device S573. Thus, recipient mobile devices which are capable of receiving the original message format receive the message in that format while recipient mobile devices not capable of receiving messages in the original message format receive a formatted message in a message format the recipient mobile device is capable of receiving.

Figure 6:
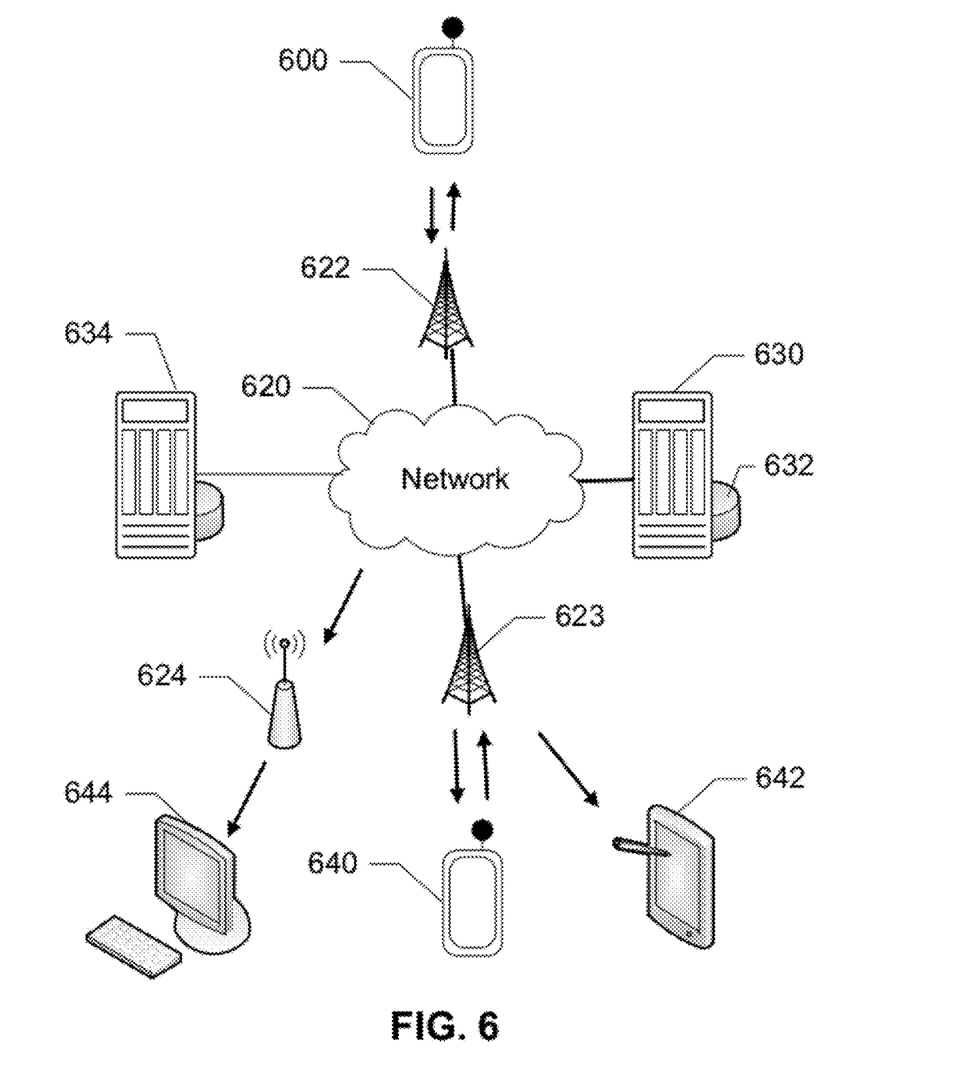
FIG. 6 shows a system for enhanced delivery of message data traffic, according to an exemplary embodiment of the present subject disclosure.

FIG. 6 shows a system for enhanced delivery of message data traffic, according to an exemplary embodiment of the present subject disclosure. In this embodiment, the system includes a sending mobile device 600, a cellular network 620 including base stations 622 and 623, a compatibility server 630, a compatibility database 632, a content server 634, a recipient mobile device 640, a computer 644, and an alternate mobile device 642. Many of these features are substantially similar to those described in FIG. 1. In addition to the features present in FIG. 1, the system includes content server 634, computer 644, and alternate mobile device 642. Content server 634 is a server on cellular network 620 where the full content of messages may be stored. When capabilities server 630 converts a message to a new format, the original content is sent to content server 634. The full content of the message may be accessed from content server 634 using, for instance, a URL linked to the location of the message. In embodiments of the subject disclosure, a plurality of content servers are distributed about the cellular network 620. A separate content server may be used for text messages, picture messages, video messages, e-mails, etc. Content server 634 may be accessed by devices other than recipient mobile device 640. For instance, computer 644 may access cellular network 620 and content server 634 using an access point 624, such as a WiFi hotspot, and locate full content for a message, via a URL. Alternatively, alternate mobile device 642 on cellular network 620 may be used to access the full content of the message. Alternate mobile device 642 may be, for instance, a tablet PC or IPAD®. Alternate mobile device 642 may, for instance, have necessary device capabilities for receiving the message in the original message format. In some embodiments, an address for alternate mobile device 642 is stored with the contact information for recipient mobile device 640. When a message cannot be delivered to recipient mobile device 640 in the original message format, the message is formatted and sent to recipient mobile device 640, with the message in its original format sent to the alternate address. The alternate address may be, for instance, a device, an e-mail address, etc., and may be selected by the user of recipient mobile device 640, compatibility server 630, etc.

The formatting of the message may occur at the sending mobile device 600 or on the compatibility server 630. In embodiments wherein the compatibility server 630 formats the message, if the sending mobile device 600 knows the capabilities of the recipient mobile device(s) 640, then the messages that need to be converted are sent to the compatibility server 630. Messages to be delivered to recipient mobile device(s) 640 capable of receiving the message may be sent directly over the cellular network 620 to the recipient mobile device(s) 640, without being first delivered to the compatibility server 630. In embodiments where the sending mobile device 600 converts the message, the message is converted by logic on the sending device 600 according to the settings and preferences and sent directly to the recipient mobile device(s) 640 over the cellular network 620. Thus, messages that need to be converted by the compatibility server 630 are sent to the compatibility server 630 while other messages are sent directly through the cellular network 620 to the recipient mobile device(s) 640. In either case, conversion of the message format may be done in a manner completely transparent to the user. In other embodiments, the mobile device 600 and the compatibility server 630 may format messages. The mobile device 600 and the compatibility server 630 communicate to determine the most efficient manner to send a message. This can help free network resources in the network 620 or local resources on the mobile device 600.

In embodiments of the present subject disclosure, further capabilities of the recipient mobile device 640 may determine the message format received by the recipient mobile device 640. For instance, when the compatibility server 630 queries the recipient mobile device 640 for the recipient mobile device's 640 capabilities, the recipient mobile device 640 may notify the compatibility server 630 that the recipient mobile device 640 is WiFi capable and in range of a WiFi access point. Because the compatibility server 630 knows there is an internet connection in range of the recipient mobile device 640, instead of sending a video message or picture message, the compatibility server 630 sends a text message with a URL to locate the message to the recipient mobile device 640. Such a capability may save cellular network resources by not sending these larger files.

Figure 7:
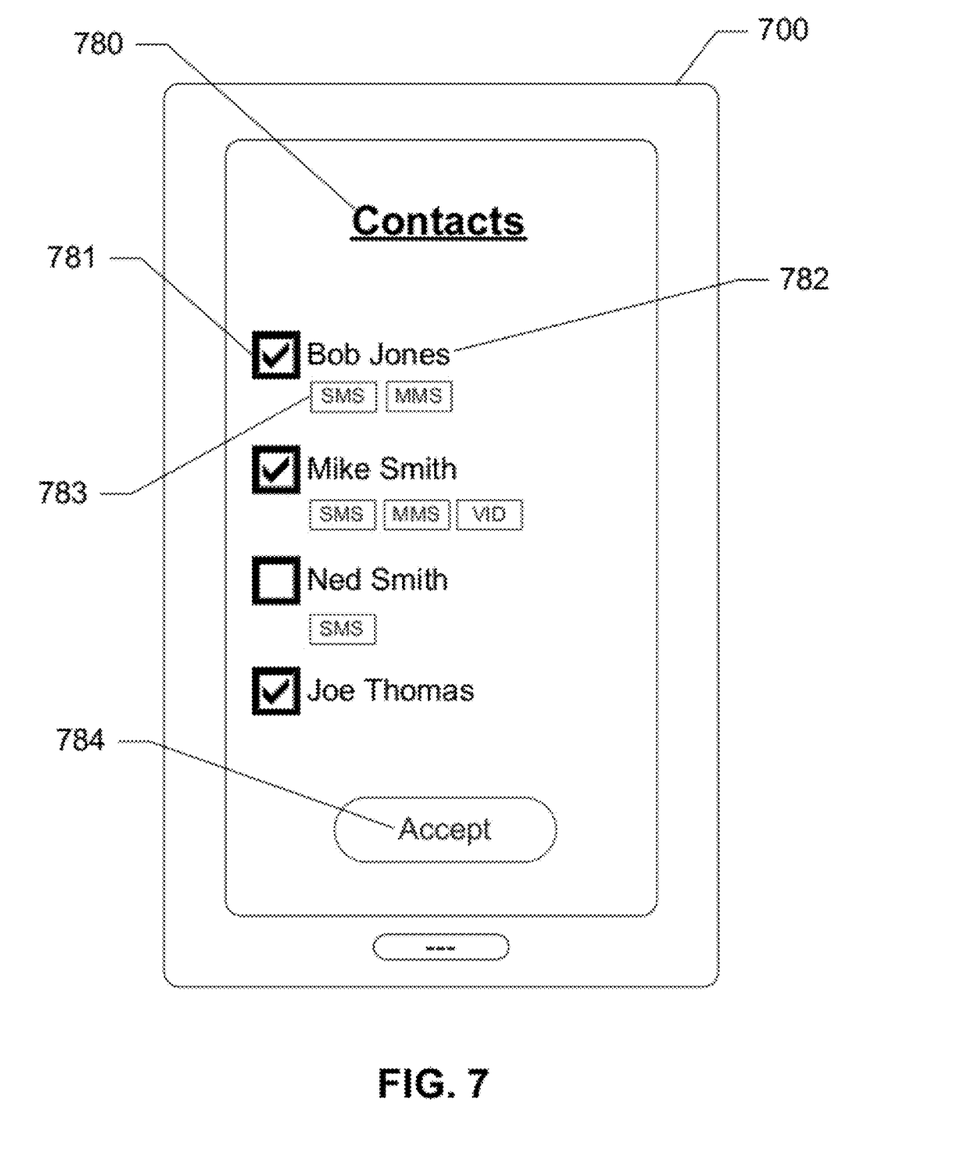
FIG. 7 shows a contact capabilities interface, according to an exemplary embodiment of the present subject disclosure.

FIG. 7 shows a contact capabilities interface 780, according to an exemplary embodiment of the present subject disclosure. In this embodiment, a user of a sending mobile device 700 can view and utilize contact capabilities interface 780 to determine which contacts to send a message to. For instance, the user may wish to send a MMS message to contacts capable of receiving this type of message. The user can view the contacts capable of receiving an MMS message and select these contacts. Contact capabilities interface 780 includes a selection box 781, a contact name 782, capabilities 783, and an accept button 784. Selection box 781 allows the user to select a contact, for example, to send a message to that contact. Contact name 782 provides an identifier of the contact which may be selected using selection box 781. Capabilities 783 displays the capabilities of the contact. While SMS capability, MMS capability, and video capability are shown, any other capabilities of the device may also be included, such as data, e-mail, etc. Accept 784 allows the user to accept the selected contacts and, for instance, send a message to those contacts. As shown, the contact 'Bob Jones' has been selected to receive a message and is capable of receiving SMS messages and MMS messages. The contact "Mike Smith" has been selected to receive the message and is capable of receiving SMS messages, MMS messages, and video messages. The contact "Ned Smith" has not been selected to receive the message and is capable of receiving SMS messages. The contact "Joe Thomas" has been selected, but the capabilities of this contact are unknown or the message formats are not possible. Contact capabilities interface 780 may also provide the user with an initial indication of whether a message will be converted. For instance, if the user is sending an MMS message, but can see that a contact can only receive an SMS message, the user will know that the contact will receive the message in an SMS format.

In further embodiments of the present subject disclosure, the user may be able to organize contacts based upon the types of messages the recipient mobile device of the contact can receive. For instance, all devices capable of receiving video messages may be grouped together. Thus, when the user wishes to send a video message to those recipient mobile devices capable of receiving the video message, the user can easily select from the grouped contacts. The devices may be grouped into folders, grouped within a list, grouped within multiple selectable lists, etc.

Figure 8:
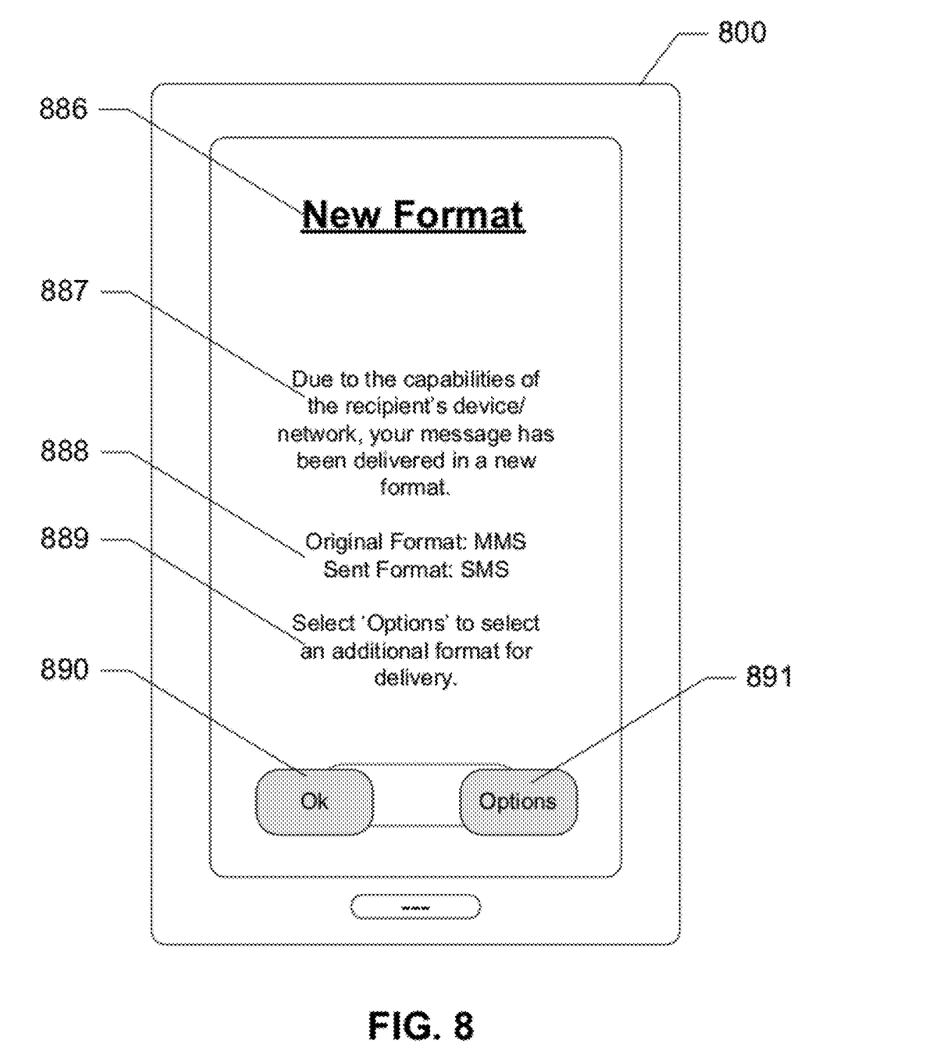
FIG. 8 shows a new format notification, according to an exemplary embodiment of the present subject disclosure.

FIG. 8 shows a new format notification 886, according to an exemplary embodiment of the present subject disclosure. In this embodiment, when a sending mobile device 800 has sent a message that is not compatible with a recipient mobile device, a compatibility server may change the message format of the message. In such an instance, the compatibility server may notify sending mobile device 800 with new format notification 886. New format notification 886 includes a change message 887, a format change 888, an options message 889, an 'Ok' button 890, and an 'Options' button 891. Change message 887 is a short message notifying the user of a change in the format of the message the user sent to the recipient mobile device. Format change 888 notifies the user of the original format of the message sent to the recipient mobile device, in this case an MMS message, and a format in which the message was sent to the recipient mobile device, in this case an SMS message. Options message 889 informs the user that further options for sending the message may be possible by selecting 'Options' button 891. 'Ok" button 890 may be selected to go back to a previous screen, home screen, etc. and may accept any newly changed options.

Figure 9:
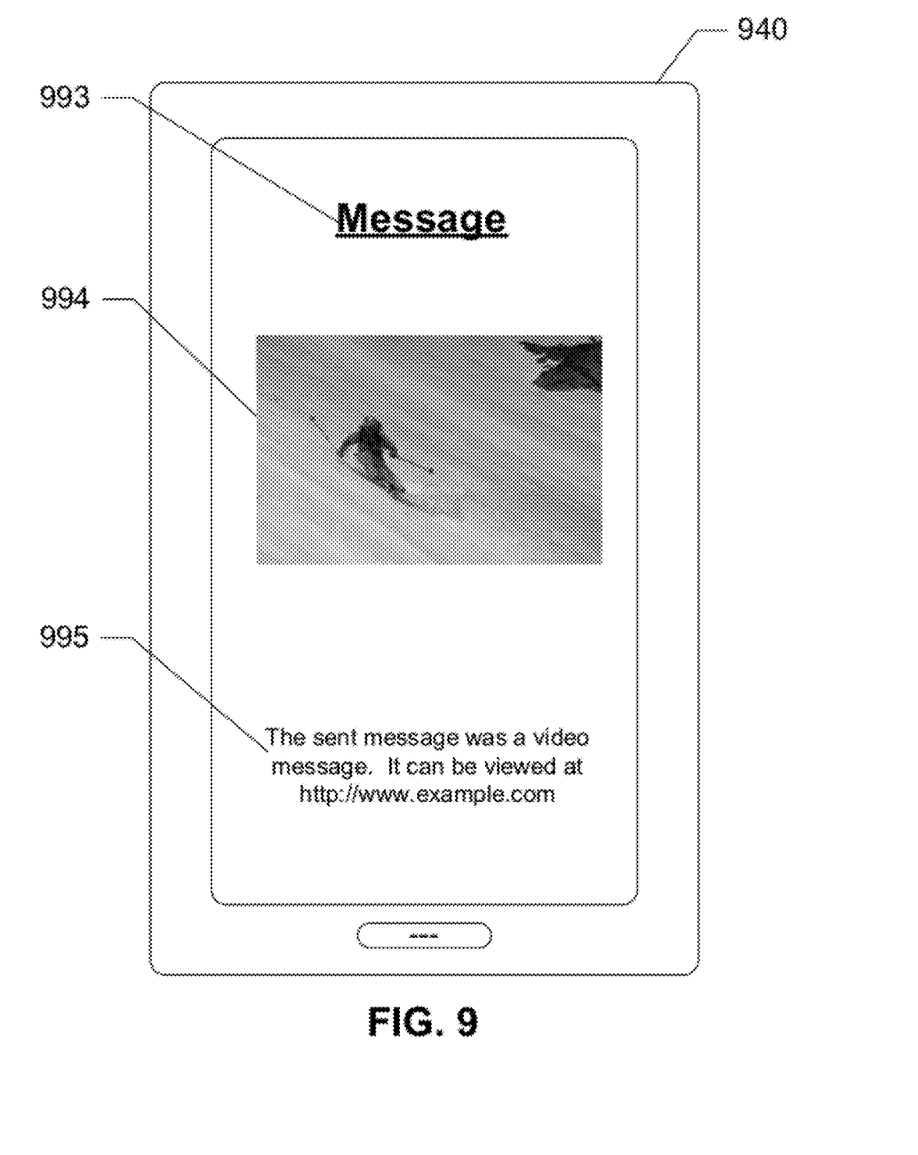
FIG. 9 shows a reformatted message, according to an exemplary embodiment of the present subject disclosure.

FIG. 9 shows a reformatted message 993, according to an exemplary embodiment of the present subject disclosure. In this embodiment, a recipient mobile device 940 has been sent a message by a sending mobile device. However, recipient mobile device 940 is not capable of receiving the message type sent by the sending mobile device. For instance, the sending mobile device may have sent a video message while recipient mobile device 940 may only be capable of receiving text and picture messages. In such an instance, a compatibility server may convert the video message to a picture message and send the picture message to recipient mobile device 940. Reformatted message 993 includes a screenshot 994 and a format message 995. Screenshot 994 is an image from the video originally sent as a video message to recipient mobile device 940. Format message 995 informs the user of recipient mobile device 940 of the original format of the message. Format message 995 may further include a URL to locate a stored copy of the video.

While this example shows a screenshot of a video, many other format conversions are also possible and may utilize a similar reformatted message. For example, in further embodiments of the present subject disclosure the sent message may be a picture message while the recipient mobile device can only receive text messages. The reformatted message may display any text associated with the picture message along with a URL to view the picture. If the sent message is a video message and the recipient mobile device is only capable of receiving text messages, the reformatted message may simply be the text of a URL to locate the video message. Many other variations of format conversions are possible and will become apparent to one of ordinary skill in the art in view of this disclosure.

The present disclosure includes elements that seek to overcome many of the routine and recurring challenges of enhanced message content delivery failure. Users get frustrated when there is a continual rejection of sent messages due to content compatibility issues, and a method or methods to reduce, eliminate and bypass these issues is a welcome relief to many users. The present disclosure may help to improve customer satisfaction by providing delivery options that overcome common issues of compatibility that impact message or content delivery. The present subject disclosure creates and enriches the culture of competitive excellence by carrier profiling and content modification and/or re-vectoring. This serves the customer, but exposes gaps in the provider service or devices that create limitations for their customers, thereby possibly driving customers to the more able service provider or device manufacturer's devices.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. For instance, communication between mobile devices and network elements can be accomplished by Internet Protocol (IP) addressing, Session Initiation Protocol (SIP) signaling over an IP Multimedia System (IMS), Voice over IP (VoIP), etc. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A mobile device comprising:
   a processor; and
   a memory that stores computer-readable instructions that, when executed by the processor, cause the processor to perform operations comprising
   in response to receiving a rejection message from a recipient device, determining that a first format of a message is incompatible with the recipient device, the message comprising original content,
   transmitting a query to the recipient device, the query requesting a recipient device type, a network on which the recipient device is located, a subscription associated with the recipient device, and a preferred location to send the original content,
   receiving, from the recipient device, a response to the query, the response comprising the recipient device type, the network on which the recipient device is located, the subscription associated with the recipient device, and the preferred location to send the original content,
   determining, based upon the recipient device type, the network on which the recipient is located, and the subscription associated with the recipient device, a second format of the message to be compatible with the recipient device,
   updating a compatibility database to include the second format as being compatible with the recipient device,
   converting the message from the first format into the second format determined to be compatible with the recipient device, thereby creating a converted message comprising modified content, the modified content comprising the original content modified in accordance with the second format,
   sending the converted message and an indication that the original content is available at the preferred location to the recipient device, and
   sending the original content to the preferred location.

2. The mobile device of claim 1, wherein the compatibility database comprises capabilities of a plurality of recipient mobile devices.

3. The mobile device of claim 1, wherein the first format of the message is one of a text message, a picture message, a video message, a voice message, or an e-mail.

4. The mobile device of claim 3, wherein the text message is a short message service message.

5. The mobile device of claim 3, wherein the picture message is a multimedia messaging service message.

6. The mobile device of claim 3, wherein the video message is a multimedia messaging service message.

7. The mobile device of claim 3, wherein the second format is one of a text message, a picture message, and or a voice message.

8. The mobile device of claim 1, wherein the memory contains a plurality of user preferences and settings for the converting.

9. The mobile device of claim 1, wherein the preferred location comprises a uniform resource locator, an email address, or a web portal.

10. The mobile device of claim 1, wherein the memory also stores an address book, the address book comprising a contact associated with the recipient device, and wherein updating the compatibility database comprises updating a compatibility profile associated with the contact.

11. The mobile device of claim 10, wherein the compatibility profile comprises a preference associated with the contact, and wherein determining the second format of the message to be compatible with the recipient device is further based upon the preference associated with the contact.

12. A compatibility server system comprising:
    a processor; and
    a memory that stores computer-readable instructions that, when executed by the processor, cause the processor to perform operations comprising
    in response to receiving a rejection message from a recipient device, determining that a first format of a message is incompatible with the recipient device, the message comprising original content,
    transmitting a query to the recipient device, the query requesting a recipient device type, a network on which the recipient device is located, a subscription associated with the recipient device, and a preferred location to send the original content,
    receiving, from the recipient device, a response to the query, the response comprising the recipient device type, the network on which the recipient device is located, the subscription associated with the recipient device, and the preferred location to send the original content, determining, based upon the recipient device type, the network on which the recipient is located, and the subscription associated with the recipient device, a second format of the message to be compatible with the recipient device, updating a compatibility database to include the second format as being compatible with the recipient device, converting the message from the first format into the second format determined to be compatible with the recipient device, thereby creating a converted message comprising modified content, the modified content comprising the original content modified in accordance with the second format, sending the converted message and an indication that the original content is available at the preferred location to the recipient device, and sending the the original content to the preferred location.

13. The compatibility server system of claim 12, wherein the compatibility database contains capabilities of a plurality of recipient mobile devices.

14. The compatibility server system of claim 12, wherein the operations further comprise sending the original content and the modified content to a content server for storage.

15. The compatibility server system of claim 14, wherein the original content and the modified content stored on the content server can be accessed using a uniform resource locator.

16. The compatibility server system of claim 12, wherein the preferred location comprises a uniform resource locator, an email address, or a web portal.

17. The compatibility server system of claim 12, wherein the memory also stores a compatibility profile associated with the recipient device, and wherein updating the compatibility database comprises updating the compatibility profile associated with the recipient device.

18. The compatibility server system of claim 17, wherein the compatibility profile comprises a preference, and wherein determining the second format of the message to be compatible with the recipient device is further based upon the preference.

19. A method comprising:

receiving, by a compatibility server comprising a processor, a message from a sending mobile device, the message comprising original content in a first format;

in response to receiving a rejection message from a recipient device, determining, by the compatibility server, that the first format is incompatible with the recipient mobile device;

transmitting, by the compatibility server, a query to the recipient mobile device, the query requesting a recipient device type, a network on which the recipient device is located, a subscription associated with the recipient mobile device, and a preferred location to send the original content;

receiving, by the compatibility server, a response to the query, the response comprising the recipient device type, the network on which the recipient device is located, the subscription associated with the recipient device, and the preferred location to send the original content;

determining, by the compatibility server, based upon the recipient device type, the network on which the recipient is located, and the subscription associated with the recipient device, a second format of the message to be compatible with the recipient device;

updating, by the compatibility server, a compatibility database to include the second format as being compatible with the recipient mobile device;

converting, by the compatibility server, the message from the first format into the second format determined to be compatible with the recipient mobile device, thereby creating a converted message comprising modified content, the modified content comprising the original content modified in accordance with the second format;

sending, by the compatibility server, the converted message and an indication that the original content is available at the preferred location to the preferred location; and sending, by the compatibility server, the original content to the preferred location.

20. The method of claim 19, wherein the preferred location comprises a uniform resource locator, an email address, or a web portal.

* * * * *